United States Patent Office 2,741,822
Patented Apr. 17, 1956

2,741,822

PREPARATION OF REFRACTORY PRODUCTS

Marvin J. Udy, Niagara Falls, N. Y., assignor to The Carborundum Company, Niagara Falls, N. Y., a corporation of Delaware No Drawing. Application January 29, 1951,
Serial No. 208,426

1 Claim. (Cl. 25—157)

This invention relates to the preparation of refractory products and has for an object the provision of an improved method of forming such products. More particularly, the invention contemplates the provision of a method of producing a refractory product by oxidizing in place a shaped mass comprising one or more finely divided elemental substances, each capable of forming a refractory oxide. The invention further contemplates the provision of a method of forming a refractory product in which a shaped mass comprising a finely divided inert filler material as well as one or more finely divided elemental substances and in which heat generated by oxidation of the elemental material is utilized to soften or melt the inert material to effect binding together of the particles of inert material and particles of refractory oxide resulting from oxidation of the elemental material.

In carrying out a method of my invention, I may employ any suitable elemental substance capable of reacting exothermically with gaseous oxygen to form a refractory oxide and to generate sufficient heat to melt or plasticize the refractory oxide thus produced. Preferably the elemental substance and the conditions of oxidation employed are such that oxidation of the elemental substance in finely divided form results in the development of sufficient heat to form plastic or molten particles of the resulting refractory oxide and to melt or plasticize particles of inert refractory material associated in the shaped mass with the particles of oxidizable or combustible elemental substance. Oxidation of the particles of elemental substance contained in the shaped mass of discrete particles with the resulting production of plastic or molten particles of refractory material results in conversion of the mass of discrete particles to a unitary or integrated refractory product.

For purposes of illustration, I shall describe the method of the invention as carried out with one or more elemental substances of the group consisting of magnesium, aluminum and silicon and with inert refractory fillers of the group consisting of magnesia (MgO), alumina ($Al_2O_3$) and silica ($SiO_2$), when the use of an inert filler is considered desirable.

The shaped mass of discrete particles may be formed in any suitable manner. The bonding effect between the particles need only be sufficient to permit retention of form during the handling necessary to place the mass in the oxidizing furnace or chamber. Such an effect can be produced by adhesive forces developed with slight pressure alone, or a small amount of a bonding agent may be employed to produce the desired effect. Preferably a volatile bonding agent or a readily oxidizable bonding agent is employed in order to take advantage of porosity that can be developed through elimination of the bonding agent. Suitable bonding agents include molasses and starch.

The portion of the shaped mass of particles containing the combustible elemental substance should be sufficiently porous to permit penetration of gaseous oxygen to the interior to effect substantially complete oxidation of the elemental substance. Porosity may be developed by employing inert refractory filler in a relatively coarse state. The size or thickness of the shaped mass will be limited by the porosity, that is, by the extent to which effective penetration of the oxygen can be achieved. The shaped mass may be formed as a relatively thin coating on a solid core or base of inert refractory material. The shaped mass may also be formed as a mortar between bricks or other structural elements of high-temperature apparatus to effect bonding together of the elements, or sealing of the spaces between the elements, or both bonding and sealing.

In accordance with a preferred method of the invention, a molded or shaped mass containing finely divided combustible material in the form of one or more elemental substances, and which may contain either coarse or finely divided inert refractory material, if desired, is placed in a furnace heated to a temperature sufficiently high to initiate and maintain a reaction between oxygen and the one or more elemental substances and having an atmosphere containing oxygen in a concentration sufficient to support combustion of particles of refractory elemental substance. A temperature in the range 1000° C. to 1200° C. usually is satisfactory when relatively small shaped masses are employed and produced, but the use and production of large masses may require the provision of temperatures substantially higher than 1200° C. to effect efficient and sufficiently rapid completion of essential reactions. The combustion reaction between the finely divided elemental substance or substances and the surrounding oxygen is maintained until all or substantially all of the finely divided combustible elemental material is oxidized with the production of plastic or molten particles of refractory oxide. In carrying out such an operation I prefer to employ an atmosphere consisting essentially of oxygen or oxygen enriched air and to maintain in the atmosphere a substantially constant concentration of oxygen to provide for oxidation of the elemental substance at a constant or uniform rate of speed.

The conditions of operation preferably are such that combustion of the particles of elemental substance in the shaped or molded mass is sufficiently rapid that a large amount of heat is generated and liberated rapidly. Under such conditions the heat energy is available to effect fusion among the newly-formed oxide particles resulting from combustion or oxidation of the elemental substances as well as among any particles of inert refractory material that may be present in the shaped mass. When the shaped mass is used as a mortar, the newly formed refractory oxide particles may fuse with the contacting surface portions of the structural elements with the production of an effective bond or seal or both between adjacent structural elements. The shaped mass may be employed advantageously for bonding together and sealing the spaces between non-metallic refractory structural elements of a composition similar to or different than the product of oxidation of the mass.

The range of particle sizes of the elemental substance, as well as of any added inert refractory filler material, may vary within wide limits, provided that the combustible particles can be easily ignited and can be thoroughly oxidized and provided that the noncombustible or inert particles are capable of rapidly absorbing heat and becoming plastic. Finely divided particles of oxide, elemental substance or inert filler employed in accordance with the invention comprise particles of a size or sizes that exhibit plastic behavior on rapid oxidation or heating. In the preferred ranges, the particles of elemental substance vary in size from about 100-mesh to about 400-mesh, and the particles of inert refractory filler material vary in size from about 1/8 inch or larger to 100-mesh or smaller depending upon porosity requirements.

If the amount of heat capable of being developed by the combustion of any particular quantity of the particles of elemental substance should be insufficient to effect fusion of all the particles comprising the shaped mass, an additional quantity of elemental substance may be provided, or another type of combustible material such as hydrocarbon gas can be burned in the furnace, with sufficient excess oxygen being provided, to supply any required additional heat. The simultaneous combustion of both the hydrocarbon gas and the particles of elemental substance increases the degree of heat and thereby promotes fusion among all the solid particles.

When a mixture of one part by weight of finely divided elemental silicon and about 7 parts by weight of finely divided sand (silicon dioxide) is ignited in an atmosphere of oxygen, the combustion of the finely divided elemental silicon produces the corresponding oxide (silicon dioxide) with liberation of sufficient heat to fuse the entire mass, consisting of the newly-formed silicon dioxide and the sand, into a block of fused quartz. Specifically, the combustion of one gram of elemental silicon liberates about 7,180 calories of heat energy or about 12,900 B. t. u. per pound. If the above mixture of elemental silicon and sand is molded into a coherent mass or shape, as, for example, into the shape of a brick, the resulting product after combustion is a fused quartz brick. Shaped articles other than bricks may be made with appropriate molds.

The combustion of one gram of finely divided elemental aluminum to aluminum oxide (alumina) produces 7,400 calories of heat energy, which is equivalent to 13,300 B. t. u. per pound of elemental aluminum. The heat energy liberated from oxidation of one pound of elemental aluminum may be utilized to heat about 10 pounds of finely divided alumina to the point of fusion. Therefore, to make an alumina brick, for example, about 10 pounds of low-grade finely divided alumina, such as is used in the manufacture of fire-brick, may be mixed with one pound of finely divided elemental aluminum, and the mixture may be molded or shaped into brick form and ignited by placing it in an atmosphere of oxygen in a furnace heated to a temperature of from about 1000° C. to about 1200° C. A rapid combustion occurs which plasticizes all the particles in the brick to yield a fused alumina brick of high refractory capacity suitable for use as lining material for the interior of metallurgical furnaces. Fused objects or products other than bricks may be made from the above alumina mixture.

In a manner similar to that described above for manufacturing alumina bricks, the process may be used to make fused magnesia bricks and other fused magnesia products. One gram of elemental magnesium, in the form of finely divided particles, burns to magnesia with the liberation of 6,040 calories of heat energy, equivalent to 10,872 B. t. u. per pound of elemental magnesium. This amount of heat energy, liberated from oxidation of one pound of finely divided elemental magnesium may be used to heat and fuse about 10 pounds of finely divided low-grade magnesia to the point of fusion. A brick made from one pound of finely divided elemental magnesium and about 10 pounds of low-grade magnesia, after ignition and combustion in an atmosphere of oxygen and in a furnace heated to a temperature of from about 1,000° C. to about 1200° C., exhibits high refractory capacity and is suitable for use as lining material for the interior of high-temperature arc electric metallurgical furnaces.

I claim:

The method of making a shaped refractory article of manufacture composed substantially entirely of a fused mass of particles of a single refractory oxide selected from the group consisting of alumina, magnesia and silica, said method comprising forming an article of the desired shape from a mixture of a granulated metal selected from the group consisting of aluminum, magnesium and silicon, and an oxide of the selected metal, said metal having a particle size from 100 mesh to 400 mesh, and said oxide having a particle size of 1/8" to 100 mesh, said shaped article being sufficiently porous to permit penetration of gaseous oxygen to the interior thereof to effect substantially complete oxidation of the metal, heating the shaped article in an oxidizing atmosphere to a temperature sufficiently high to initiate a reaction between the metal and the oxygen to effect substantially complete oxidation in place of the metal with the production of fused particles of the metal oxide, said particles of metal being present in the shaped mass in at least sufficient quantity to cause plasticizing, due to the heat of combustion of the metal, of the particles of refractory oxide present in the shape resulting in the fusion together of the discrete particles of the article into a unitary product.

References Cited in the file of this patent

UNITED STATES PATENTS

| | | |
|---|---|---|
| 1,856,303 | White | May 3, 1932 |
| 1,911,189 | Harris | May 30, 1933 |
| 1,934,263 | Hacks et al. | Nov. 7, 1933 |
| 2,043,867 | Rava | June 9, 1936 |
| 2,347,968 | Ross | May 2, 1944 |
| 2,454,733 | Dahl | Nov. 23, 1948 |
| 2,568,157 | Lepp et al. | Sept. 18, 1951 |

FOREIGN PATENTS

| | | |
|---|---|---|
| 402,203 | Great Britain | Nov. 30, 1933 |